(12) United States Patent
Hsieh et al.

(10) Patent No.: US 11,711,134 B2
(45) Date of Patent: Jul. 25, 2023

(54) AUTONOMOUS BEAM SWITCH IN HAPS COVERAGE

(71) Applicant: Nokia Technologies Oy, Espoo (FI)

(72) Inventors: Tzu-Chung Hsieh, Hoffman Estates, IL (US); Shahzada Basharat Rasool, Ashburn, VA (US); Gilsoo Lee, Naperville, IL (US); Athul Prasad, Naperville, IL (US); Rapeepat Ratasuk, Inverness, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/202,014

(22) Filed: Mar. 15, 2021

(65) Prior Publication Data

US 2022/0294518 A1     Sep. 15, 2022

(51) Int. Cl.
*H04B 7/185*     (2006.01)
*H04B 7/08*     (2006.01)
*H04W 72/542*     (2023.01)

(52) U.S. Cl.
CPC ......... *H04B 7/088* (2013.01); *H04B 7/18504* (2013.01); *H04W 72/542* (2023.01)

(58) Field of Classification Search
CPC .............. H04B 7/088; H04B 7/18504; H04B 7/18515; H04B 7/2041; H04W 72/085; H04W 72/542
See application file for complete search history.

(56) References Cited

U.S. PATENT DOCUMENTS

| 9,712,228 | B2 | 7/2017 | Jalali et al. |
| 10,153,829 | B2 | 12/2018 | Jalali et al. |
| 10,700,760 | B1 | 6/2020 | Berliner et al. |
| (Continued) | | | |

FOREIGN PATENT DOCUMENTS

| WO | 2001/080356 A2 | 10/2001 |
| WO | 2020/049096 A1 | 3/2020 |
| WO | 2020/176084 A1 | 9/2020 |

OTHER PUBLICATIONS

"3rd Generation Partnership Project; Technical Specification Group Radio Access Network; NR; Physical layer procedures for data (Release 16)", 3GPP TS 38.214 V16.3.0, Sep. 2020, pp. 1-166.
(Continued)

*Primary Examiner* — Kenneth T Lam
(74) *Attorney, Agent, or Firm* — Harness, Dickey & Pierce, P.L.C.

(57) ABSTRACT

A system, apparatus, method, and non-transitory computer readable medium for providing autonomous beam switching for user equipment (UE) within a cell coverage area of a high-altitude platform station (HAPS) network device, the HAPS network device may be caused the HAPS network device to, determine beam layer information corresponding to the plurality of beam layers; transmit the beam layer information to the at least one UE; receive an autonomous beam switch request from the at least one UE in response to the transmitted beam layer information, the request including beam switch parameters; determine a selected beam layer based on the beam switch parameters; and enable communication with the at least one UE using the selected beam layer.

20 Claims, 9 Drawing Sheets

(56) References Cited

U.S. PATENT DOCUMENTS

| | | | | |
|---|---|---|---|---|
| 2016/0013858 | A1* | 1/2016 | Jalali | H04B 7/0695 |
| | | | | 370/318 |
| 2017/0093482 | A1* | 3/2017 | Keshet | H04B 7/18521 |
| 2020/0204234 | A1 | 6/2020 | Zhu et al. | |
| 2020/0313817 | A1* | 10/2020 | Xu | H04W 72/046 |
| 2020/0351957 | A1* | 11/2020 | Kim | H04W 56/0045 |
| 2021/0250816 | A1* | 8/2021 | Xu | H04W 36/0058 |
| 2021/0258067 | A1* | 8/2021 | Hoshino | H04B 7/0617 |
| 2021/0399785 | A1* | 12/2021 | Sakhnini | H04W 72/1268 |
| 2022/0007351 | A1* | 1/2022 | Ma | H04W 4/023 |
| 2022/0022146 | A1* | 1/2022 | Sengupta | H04W 56/001 |
| 2022/0029697 | A1* | 1/2022 | Bakr | H04L 12/2854 |
| 2022/0038240 | A1* | 2/2022 | Ma | H04W 56/001 |
| 2022/0070749 | A1* | 3/2022 | Wang | H04B 7/185 |

OTHER PUBLICATIONS

"3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

"HAPS—High-Altitude Platform Systems", International Telecommunication Union (ITU), Retrieved on Feb. 17, 2021, Webpage available at : https://www.itu.int/en/mediacentre/backgrounders/Pages/High-altitude-platform-systems.aspx.

"Loon", Loon, Retrieved on Feb. 17, 2021, Webpage available at : https://loon.com/.

"Haps Mobile", Haps Mobile Inc, Retrieved on Feb. 17, 2021, Webpage available at : https://www.hapsmobile.com/en/.

"Airbus Zephyr", Airbus, Retrieved on Feb. 17, 2021, Webpage available at : https://www.airbus.com/defence/uav/zephyr.html.

"3rd Generation Partnership Project; Technical Specification Group Radio Access Network; Study on New Radio (NR) to support non-terrestrial networks (Release 15)", 3GPP TR 38.811 V15.4.0, Sep. 2020, pp. 1-127.

"3rd Generation Partnership Project; Technical Specification Group Radio Access Network; Solutions for NR to support non-terrestrial networks (NTN) (Release 16)", 3GPP TR 38.821 V16.0.0, Dec. 2019, pp. 1-140.

Hsieh et al., "UAV-based Multi-cell HAPS Communications: System Design and Performance Evaluation", GLOBECOM 2020—2020 IEEE Global Communications Conference, Dec. 2020, 6 pages.

Xing et al., "High Altitude Platform Stations (HAPS): Architecture and System Performance", IEEE VTC Spring, 2021, 5 pages.

"Summary of 8.4.4 Other Aspects of NR-NTN", 3GPP TSG RAN WG1 Meeting #102e, R1-200XXXX, Agenda: 8.4.4, MediaTek Inc., Aug. 17-28, 2020, 30 pages.

International Search Report and Written Opinion of the International Searching Authority for corresponding International Application No. PCT/EP2022/055234 dated Jul. 4, 2022.

* cited by examiner

TABLE 1. EXAMPLE OF LAYERED BEAM INFORMATION FOR UE

| BEAM LAYER | REFERENCE SIGNAL INDICES | BEAM DWELL TIME |
|---|---|---|
| LAYER 1 | ID_0 | |
| LAYER 2 | ID_1, ID_2, ID_3, ID_4, ID_5, ID_6 | $T_2$ |
| LAYER 3 | ID_7, ID_8, ID_9, ID_10, ID_11, ID_12, ID_13, ID_14, ID_15, ID_16, ID_17, ID_18 | $T_3$ |

FIG. 5C

AUTONOMOUS BEAM SWITCH IN HAPS COVERAGE

BACKGROUND

Field

Various example embodiments relate to methods, apparatuses, systems, and/or non-transitory computer readable media for providing autonomous beam switching for user equipment (UE) within a cell coverage area of a high-altitude platform station (HAPS) network device.

Description of the Related Art

A $5^{th}$ generation mobile network (5G) standard, referred to as 5G New Radio (NR), is being developed to provide higher capacity, higher reliability, and lower latency communications than the 4G long term evolution (LTE) standard. Additionally, high-altitude platform station (HAPS) network devices are aerial platforms, such as manned aircraft, unmanned aerial vehicles (UAVs), balloons, etc., being developed to act as 5G communication nodes (e.g., radio access network (RAN) nodes, base stations, relays, etc.) deployed in the sky at high altitudes, e.g., the stratosphere (18-24 km), etc., to provide a large cell coverage area to user equipment (UE) on the ground. The HAPS network device aerial platforms include navigation capabilities and a communication link to a ground station for command and control of the HAPS network device. Some HAPS network devices may further include latest improvements in aeronautics, solar energy, and battery efficiency which may enable the HAPS network device to stay afloat and continuously operate for several months at a time, and provide the benefit of lower operational costs versus other communication systems for the same sized coverage area, such as satellite and mobile networks. It is thought that HAPS network devices will provide mobile broadband service, massive Internet of Things (IoT) connectivity, terrestrial network backhauling, and communication services for remote geographic locations, the maritime and airline industries, public safety, and disaster relief.

SUMMARY

At least one example embodiment may be related to a high altitude platform station (HAPS) network device.

In at least one example embodiment, the HAPS network device may include a wireless antenna array configured to communicate with at least one user equipment (UE) located within a cell coverage area associated with the HAPS network device, the cell coverage area including a plurality of beam layers and a plurality of beams, each of the plurality of beam layers including at least one beam of the plurality of beams, a memory storing computer readable instructions, and processing circuitry. The processing circuitry may be configured to execute the computer readable instructions to cause the HAPS network device to determine beam layer information corresponding to the plurality of beam layers, transmit the beam layer information to the at least one UE, receive an autonomous beam switch request from the at least one UE in response to the transmitted beam layer information, the request including beam switch parameters, determine a selected beam layer based on the beam switch parameters, and enable communication with the at least one UE using the selected beam layer.

Some example embodiments provide that a direction of each beam of the plurality of beams is fixed relative to the HAPS network device.

Some example embodiments provide that each beam layer of the plurality of beam layers is associated with a layer identifier (ID), each beam of the plurality of beams is associated with a beam ID, and the processing circuitry is further configured to cause the HAPS network device to determine a beam dwell time for each of the plurality of beam layers, and transmit the beam layer information to the at least one UE, the beam layer information including the plurality of layer IDs, a plurality of beam IDs associated with a respective beam layer of the plurality of beam layers, and the plurality of beam dwell times.

Some example embodiments provide that the beam switch parameters include a selected beam ID identifying a beam selected by the UE, and reference time information associated with the selected beam.

Some example embodiments provide that the processing circuitry is further configured to cause the HAPS network device to determine the selected beam layer based on the selected beam ID, select a transmission beam from the at least one beam associated with the determined beam layer based on the reference time information, the beam dwell time corresponding to the determined beam layer, and a current time, and enable the communication with the at least one UE using the transmission beam.

Some example embodiments provide that the processing circuitry is further configured to cause the HAPS network device to transmit an acknowledgement to the at least one UE in response to the autonomous beam switch request, the acknowledgement indicating to the at least one UE to activate autonomous beam switch mode.

Some example embodiments provide that the HAPS network device is configured to fly in a desired flight pattern at a desired speed.

Some example embodiments provide that the processing circuitry is further configured to cause the HAPS network device to update the beam layer information based on a change in the desired flight pattern or a change in the desired speed of the HAPS network device, and transmit the updated beam layer information to the at least one UE.

At least one example embodiment may be related to a user equipment (UE).

In at least one example embodiment, the UE may include a memory storing computer readable instructions, and processing circuitry. The processing circuitry may be configured to execute the computer readable instructions to cause the UE to receive beam layer information from a high altitude platform station (HAPS) network device, the beam layer information including information corresponding to a plurality of beam layers associated with a cell coverage area of the HAPS network device, the cell coverage area further including a plurality of beams, and each of the plurality of beam layers including at least one beam of the plurality of beams, perform radio signal measurements associated with each of the plurality of beam layers, select a desired beam layer from the plurality of beam layers based on the radio signal measurements, transmit an autonomous beam switch request to the HAPS network device, the request including beam switch parameters associated with the selected beam layer, and enable communication with the HAPS network device using the selected beam layer.

Some example embodiments provide that the processing circuitry is further configured to cause the UE to observe a beam change pattern of the desired beam layer based on the performed radio signal measurements, validate the observed beam change pattern based on the beam layer information, and transmit the autonomous beam switch request to the HAPS network device based on results of the validation of the observed beam change pattern.

Some example embodiments provide that the processing circuitry is further configured to cause the UE to receive an acknowledgement from the HAPS network device in response to the autonomous beam switch request, and activate autonomous beam switch mode in response to the acknowledgement.

Some example embodiments provide that the processing circuitry is further configured to cause the UE to measure a reference signal strength for the at least one beam of each of the plurality of beam layers, determine a strongest beam based on the measured reference signal strengths, select a beam layer associated with the strongest beam as the desired beam layer, determine a maximum signal strength and a minimum signal strength associated with the strongest beam, and determine reference time information based on a time associated with the maximum signal strength of the strongest beam.

Some example embodiments provide that the beam switch parameters include a selected beam ID identifying the strongest beam, and the reference time information.

Some example embodiments provide that each beam layer of the plurality of beam layers is associated with a layer identifier (ID) and a beam dwell time, and the beam layer information includes the plurality of layer IDs, a plurality of beam IDs associated with a respective beam layer of the plurality of beam layers, and the plurality of beam dwell times.

Some example embodiments provide that the processing circuitry is further configured to cause the UE to autonomously select a transmission beam from the at least one beam associated with the selected beam layer based on the reference time information, the beam dwell time corresponding to the selected beam layer, and a current time, and enable the communication with the HAPS network device using the selected transmission beam.

Some example embodiments provide that the processing circuitry is further configured to cause the UE to monitor a reference signal strength of the at least one beam of the desired beam layer, determine whether the monitored reference signal strengths of the at least one beam are within an expected range, perform updated radio signal measurements associated with each of the plurality of beam layers based on results of the determining, select a new desired beam layer from the plurality of beam layers based on the updated radio signal measurements, transmit a new autonomous beam switch request to the HAPS network device, the request including updated beam switch parameters associated with the selected new beam layer, and enable the communication with the HAPS network device using the selected new beam layer.

At least one example embodiment may be related to a method of operating a high altitude platform station (HAPS) network device.

In at least one example embodiment, the method may include determining beam layer information corresponding to a plurality of beam layers, the beam layer information including information corresponding to a plurality of beam layers associated with a cell coverage area of the HAPS network device, the cell coverage area further including a plurality of beams, and each of the plurality of beam layers including at least one beam of the plurality of beams, transmitting the beam layer information to at least one user equipment (UE), receiving an autonomous beam switch request from the at least one UE in response to the transmitted beam layer information, the request including beam switch parameters, determining a selected beam layer based on the beam switch parameters, and enabling communication with the at least one UE using the selected beam layer.

Some example embodiments provide that the method may further include determining a beam dwell time for each of the plurality of beam layers, selecting a beam from the at least one beam associated with the selected beam layer based on reference time information included in the beam switch parameters, a beam dwell time corresponding to the selected beam layer, and a current time, and enabling the communication with the at least one UE using the selected beam.

Some example embodiments provide that the beam switch parameters may include a selected beam ID identifying a beam selected by the UE, and reference time information associated with the selected beam, and the method may further include determining the selected beam layer based on the selected beam ID, selecting a transmission beam from the at least one beam associated with the determined beam layer based on the reference time information, the beam dwell time corresponding to the determined beam layer, and a current time, and enabling the communication with the at least one UE using the transmission beam.

Some example embodiments provide that the method may further include updating the beam layer information based on a change in a desired flight pattern of the HAPS network device or a change in a desired speed of the HAPS network device, and transmitting the updated beam layer information to the at least one UE.

At least one example embodiment may be related to a high altitude platform station (HAPS) network device.

In at least one example embodiment, the HAPS network device may include means for communicating with at least one user equipment (UE) located within a cell coverage area associated with the HAPS network device, the cell coverage area including a plurality of beam layers and a plurality of beams, each of the plurality of beam layers including at least one beam of the plurality of beams, storing computer readable instructions, and executing the computer readable instructions to determine beam layer information corresponding to the plurality of beam layers, transmit the beam layer information to the at least one UE, receive an autonomous beam switch request from the at least one UE in response to the transmitted beam layer information, the request including beam switch parameters, determine a selected beam layer based on the beam switch parameters, and enable communication with the at least one UE using the selected beam layer.

Some example embodiments provide that a direction of each beam of the plurality of beams is fixed relative to the HAPS network device.

Some example embodiments provide that each beam layer of the plurality of beam layers is associated with a layer identifier (ID), each beam of the plurality of beams is associated with a beam ID, and the HAPS network device further includes means for determining a beam dwell time for each of the plurality of beam layers, and transmitting the beam layer information to the at least one UE, the beam layer information including the plurality of layer IDs, a plurality of beam IDs associated with a respective beam layer of the plurality of beam layers, and the plurality of beam dwell times.

Some example embodiments provide that the beam switch parameters include a selected beam ID identifying a beam selected by the UE, and reference time information associated with the selected beam.

Some example embodiments provide that the HAPS network device further includes means for determining the selected beam layer based on the selected beam ID, selecting a transmission beam from the at least one beam associated with the determined beam layer based on the reference time information, the beam dwell time corresponding to the determined beam layer, and a current time, and enabling the communication with the at least one UE using the transmission beam.

Some example embodiments provide that the HAPS network device further includes means for transmitting an acknowledgement to the at least one UE in response to the autonomous beam switch request, the acknowledgement indicating to the at least one UE to activate autonomous beam switch mode.

Some example embodiments provide that the HAPS network device may further include means for flying in a desired flight pattern at a desired speed.

Some example embodiments provide that the HAPS network device may further include means for updating the beam layer information based on a change in the desired flight pattern or a change in the desired speed of the HAPS network device, and transmitting the updated beam layer information to the at least one UE.

At least one example embodiment may be related to a user equipment (UE).

In at least one example embodiment, the UE may include means for storing computer readable instructions, and executing the computer readable instructions to receive beam layer information from a high altitude platform station (HAPS) network device, the beam layer information including information corresponding to a plurality of beam layers associated with a cell coverage area of the HAPS network device, the cell coverage area further including a plurality of beams, and each of the plurality of beam layers including at least one beam of the plurality of beams, perform radio signal measurements associated with each of the plurality of beam layers, select a desired beam layer from the plurality of beam layers based on the radio signal measurements, transmit an autonomous beam switch request to the HAPS network device, the request including beam switch parameters associated with the selected beam layer, and enable communication with the HAPS network device using the selected beam layer.

Some example embodiments provide that the UE may further include means for observing a beam change pattern of the desired beam layer based on the performed radio signal measurements, validating the observed beam change pattern based on the beam layer information, and transmitting the autonomous beam switch request to the HAPS network device based on results of the validation of the observed beam change pattern.

Some example embodiments provide that the UE may further include means for receiving an acknowledgement from the HAPS network device in response to the autonomous beam switch request, and activating autonomous beam switch mode in response to the acknowledgement.

Some example embodiments provide that the UE may further include means for measuring a reference signal strength for the at least one beam of each of the plurality of beam layers, determining a strongest beam based on the measured reference signal strengths, selecting a beam layer associated with the strongest beam as the desired beam layer, determining a maximum signal strength and a minimum signal strength associated with the strongest beam, and determining reference time information based on a time associated with the maximum signal strength of the strongest beam.

Some example embodiments provide that the beam switch parameters include a selected beam ID identifying the strongest beam, and the reference time information.

Some example embodiments provide that each beam layer of the plurality of beam layers is associated with a layer identifier (ID) and a beam dwell time, and the beam layer information includes the plurality of layer IDs, a plurality of beam IDs associated with a respective beam layer of the plurality of beam layers, and the plurality of beam dwell times.

Some example embodiments provide that the UE may further include means for autonomously selecting a transmission beam from the at least one beam associated with the selected beam layer based on the reference time information, the beam dwell time corresponding to the selected beam layer, and a current time, and enabling the communication with the HAPS network device using the selected transmission beam.

Some example embodiments provide that the UE may further include means for monitoring a reference signal strength of the at least one beam of the desired beam layer, determining whether the monitored reference signal strengths of the at least one beam are within an expected range, performing updated radio signal measurements associated with each of the plurality of beam layers based on results of the determining, selecting a new desired beam layer from the plurality of beam layers based on the updated radio signal measurements, transmitting a new autonomous beam switch request to the HAPS network device, the request including updated beam switch parameters associated with the selected new beam layer, and enabling the communication with the HAPS network device using the selected new beam layer.

BRIEF DESCRIPTION OF THE DRAWINGS

The accompanying drawings, which are incorporated in and constitute a part of the specification, illustrate one or more example embodiments and, together with the description, explain these example embodiments. In the drawings:

FIG. 5C illustrates an example table of beam layer information according to at least one example embodiment;

DETAILED DESCRIPTION

Figure 1:
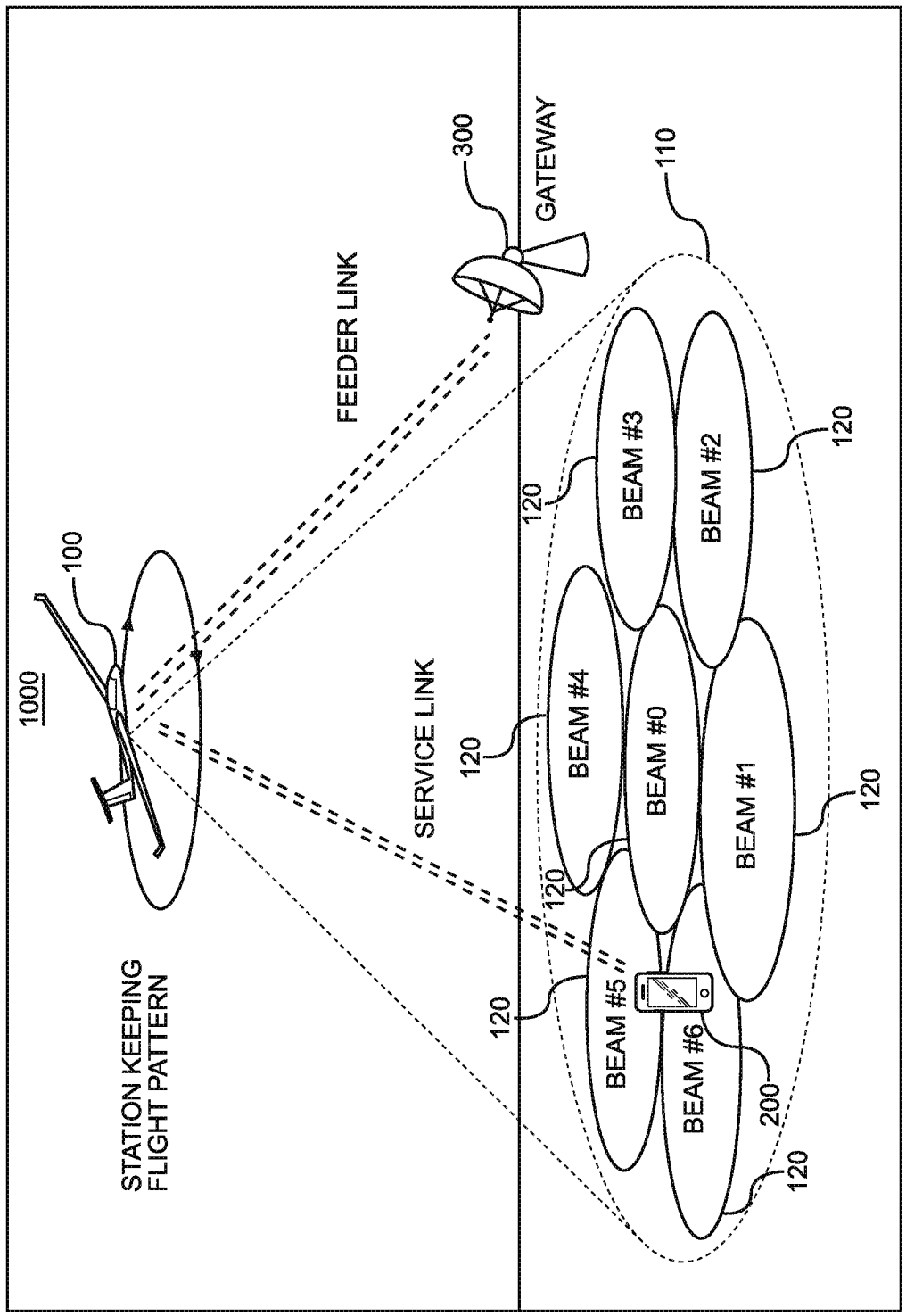
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

FIG. 1 illustrates a wireless communication system according to at least one example embodiment. As shown in FIG. 1, a wireless communication system 1000 includes at least one high-altitude platform station (HAPS) network device 100 (e.g., a HAPS aerial platform, etc.), at least one user equipment (UE) device 200 (UEs or UE devices), at least one core network gateway 300, etc., but the example embodiments are not limited thereto and the example embodiments may include a greater or lesser number of constituent elements. For example, the wireless communication system 1000 may include a plurality of UE devices, a plurality of HAPS network devices, and/or a plurality of core network gateways, etc.

According to some example embodiments, the HAPS network device 100 may be a manned and/or unmanned aerial vehicle, such as a manned aircraft, an unmanned aerial vehicle (UAV), a balloon, a blimp, etc., but the example embodiments are not limited thereto. Additionally, the HAPS network device 100 may be deployed at high altitudes, such as the stratosphere (e.g., 18-24 km), etc., but is not limited thereto.

The HAPS network device 100 may operate as a RAN node according to an underlying cellular and/or wireless network communications protocol, such as the 5G NR or LTE communication protocol, etc., but is not limited thereto. For example, the HAPS network device 100 may operate as a 5G gNB node or an LTE ng-eNB node, etc., but the example embodiments are not limited thereto. According to some example embodiments, when the HAPS network device 100 operates as the RAN node (e.g., operates as a "regenerative" HAPS device, etc.), the HAPS network device 100 will digitally process wireless communication signals (e.g., 5G NR signals, etc.) and is the wireless communication signal transmission and reception point. According to some example embodiments, the HAPS network device 100 may contain some or all of the components of a gNB node or a ng-eNB node, etc., such as a distributed unit (DU) and/or a central unit (CU), etc. According to some example embodiments, the HAPS network device 100 may fly along a desired flight pattern (e.g., a programmed flight pattern, a determined flight pattern, etc.) at a desired air speed (e.g., a programmed air speed, a determined air speed, etc.), but the example embodiments are not limited thereto.

Additionally, in some example embodiments, the HAPS network device 100 may operate as a RAN node in combination with the core network gateway 300 (e.g., the RAN node is co-located in the HAPS network device 100 and the core network gateway 300), with the HAPS network device 100 operating as a repeater or a "transparent" aerial platform, and performing frequency conversion and amplification of the wireless communication signal (e.g., 5G NR signal, etc.) transmitted from the core network gateway 300 over a feeder link. Also, the core network gateway 300 may in turn be connected to a Data Network (not shown), such as the Internet, an intranet, a wide area network, etc., and/or core network elements, such as servers, access points, switches, routers, nodes, etc. According to some example embodiments, a RAN node, such as a gNB node, etc., may have a split architecture where, for example, the distributed unit (DU) and the central unit (CU) are not collocated, and instead, the components of the RAN node may be deployed in separate locations. For example, in the example of a gNB node, the DU may be onboard the HAPS network device 100, and the CU is located at the core network gateway 300, but the example embodiments are not limited thereto.

Moreover, the components of the RAN node, such as the DU and the CU, etc., may be logical units, and each may perform various RAN node functions based on the wireless communication protocol. For example, if the HAPS network device 100 is configured as a gNB node, the 5G NR network functions allocated to the gNB node may be split between the DU and the CU. In this example, the CU may include the mobility control, radio access network sharing (RANS), positioning, session management function (SMF), etc., network functions, and the DU may include the packet data convergence protocol (PDCP), radio link control (RLC), medium access control (MAC), Physical Layer, radio frequency (RF), etc., network functions, but the example embodiments are not limited thereto.

In either the "regenerative" or "transparent" configuration, the wireless connection between the HAPS network device 100 and the core network gateway 300 may be referred to as a "feeder link," and the wireless connection between the HAPS network device 100 and the at least one UE device 200 may be referred to as service links. The HAPS network device 100 may emit a radio signal to a desired geographical location on Earth, such as cell coverage area 110 (e.g., a beam footprint, a HAPS device cell, a HAPS device service area, a broadcast area, etc.). The terrestrial location covered by the HAPS network device 100's cell coverage area 110 may be based on the position of the HAPS network device 100 in relation to the Earth, the beam direction, settings of the HAPS network device 100's wireless transmitter (e.g., a wireless antenna array, a beam emitter array, etc.) and/or the movement of the HAPS network device 100 in relation to the Earth, etc.

According to at least one example embodiment, the cell coverage area 110 may be composed of (e.g., may include) a plurality of individual beams 120 that are arranged in at least one beam layer, but the example embodiments are not limited thereto. According to some example embodiments, the direction, orientation, and/or position of the cell coverage area 110 and/or the individual beams 120 may be fixed in relation to the HAPS network device 100 (e.g., fixed relative to the position and/or orientation of the HAPS network device 100), but the example embodiments are not limited thereto, and for example, the HAPS network device 100 may include beam steering mechanism to steer the geo-location of the cell coverage area 110 and/or one or more of the individual beams 120 relative to the position and/or orientation of the HAPS network device 100. The HAPS network device 100 may provide wireless network services to one or more UE devices within the cell coverage area 110, etc. For example, UE device 200 is located within the cell coverage area 110, and may connect to, receive multicast messages from, receive broadcast messages from, receive paging messages from, receive/transmit signaling messages from/to, and/or access the wireless network through, etc., HAPS network device 100 (e.g., the RAN node serving the UE device 200), but the example embodiments are not limited thereto.

Additionally, the relative position of the cell coverage area 110 and the individual beam coverage areas 120 in relation to the HAPS network device 100 may be static (e.g., fixed, stationary, etc.) or transitory (e.g., moving, etc.), or a combination of static and transitory, based on the movement (or lack thereof) of the HAPS network device 100, but the example embodiments are not limited thereto. For example, the HAPS network device 100 may engage in "station keeping," e.g., travel in a substantially circular flight pattern at a substantially constant speed above the center of a service area, but the example embodiments are not limited thereto. The flight pattern may be small relative to the size of the service area, e.g., a circular 3 km radius may provide a 100 km radius coverage area, etc., but the example embodiments are not limited thereto. However, when the HAPS network device 100 encounters environmental factors, such as strong winds, change in air current patterns, weather effects, etc., the HAPS network device 100 may change its flight pattern to conserve energy.

According to some example embodiments, the HAPS network device 100 may be equipped with a wireless antenna array (e.g., antenna array, beam array, a plurality of beam emitters, etc.). The wireless antenna array may be fixed (e.g., the orientation of the wireless antenna array may be fixed, etc.), however the example embodiments are not limited thereto, and the wireless antenna array may include an antenna steering and/or beam steering mechanism. Because the HAPS network device 100 may be in motion, the cell coverage area 110 corresponding to the HAPS network device 100 may be transitory as well, which may cause increased and/or excessive handovers and/or connection interruptions for UE devices, e.g., UE 200, etc., connected to the HAPS network device 100. Accordingly, if the HAPS network device 100 includes beam steering mechanism, the cell coverage area 110 may be constantly steered to counter the motion of the HAPS network device 100 so that the cell coverage area 110 is maintained (e.g., substantially stationary, etc.) relative to a desired position on the ground. However, a potential disadvantage of using a beam steering mechanism is a substantial increase in weight of the HAPS network device 100 due to the weight of the beam steering mechanism, which reduces the flight time (e.g., amount of time in the air) of the HAPS network device 100. Moreover, one of the advantages of the HAPS network device 100 is the ability to be embodied as battery and/or solar powered aerial vehicles, and a reduction in weight provided by the absence of the beam steering mechanism is desired in order to increase the flight time and/or capabilities of the battery and/or solar powered aerial vehicles.

Therefore, according to some example embodiments, the beam steering mechanism may be omitted from the HAPS network device 100, and the UE device 200 may autonomously switch (e.g., without explicit beam switching instructions and/or other beam switching signaling from the HAPS network device 100, the core network gateway 300, and/or any other core network device, etc.) between one or more individual beams 120 of the cell coverage area 110 as the HAPS network device 100 flies along its circular flight pattern. The cell coverage area 110 and at least one method of autonomously switching between individual beams 120 will be discussed in greater detail in connection with FIGS. 4 to 7.

Referring back to FIG. 1, the HAPS network device 100 and/or the UE device 200 may be connected over a wireless network, such as a cellular wireless access network (e.g., a 3G wireless access network, a 4G-Long Term Evolution (LTE) network, a 5G-New Radio (e.g., 5G) wireless network, a WiFi network, etc.). The wireless network may include a core network including the core network gateway 300 and/or a Data Network (DN) (not shown). Additionally, the HAPS network device 100 may connect to additional HAPS network devices (not shown), and/or other RAN nodes (not shown), but is not limited thereto. The DN may refer to the Internet, an intranet, a wide area network, a local area network, a cloud network, a distributed network, etc.

The UE device 200 may be any one of, but not limited to, a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to, for example, the 5G NR communication standard, and/or other wireless communication standard(s). The UE device 200 may be configurable to transmit and/or receive data in accordance to strict latency, reliability, and/or accuracy requirements, such as URLLC communications, TSC communications, etc., but the example embodiments are not limited thereto.

While certain components of a wireless communication network are shown as part of the wireless communication system of FIG. 1, the example embodiments are not limited thereto, and the wireless communication network 1000 may include components other than that shown in FIG. 1, which are desired, necessary, and/or beneficial for operation of the underlying networks within the wireless communication system, such as access points, switches, routers, nodes, servers, gateways, etc.

Figure 2:
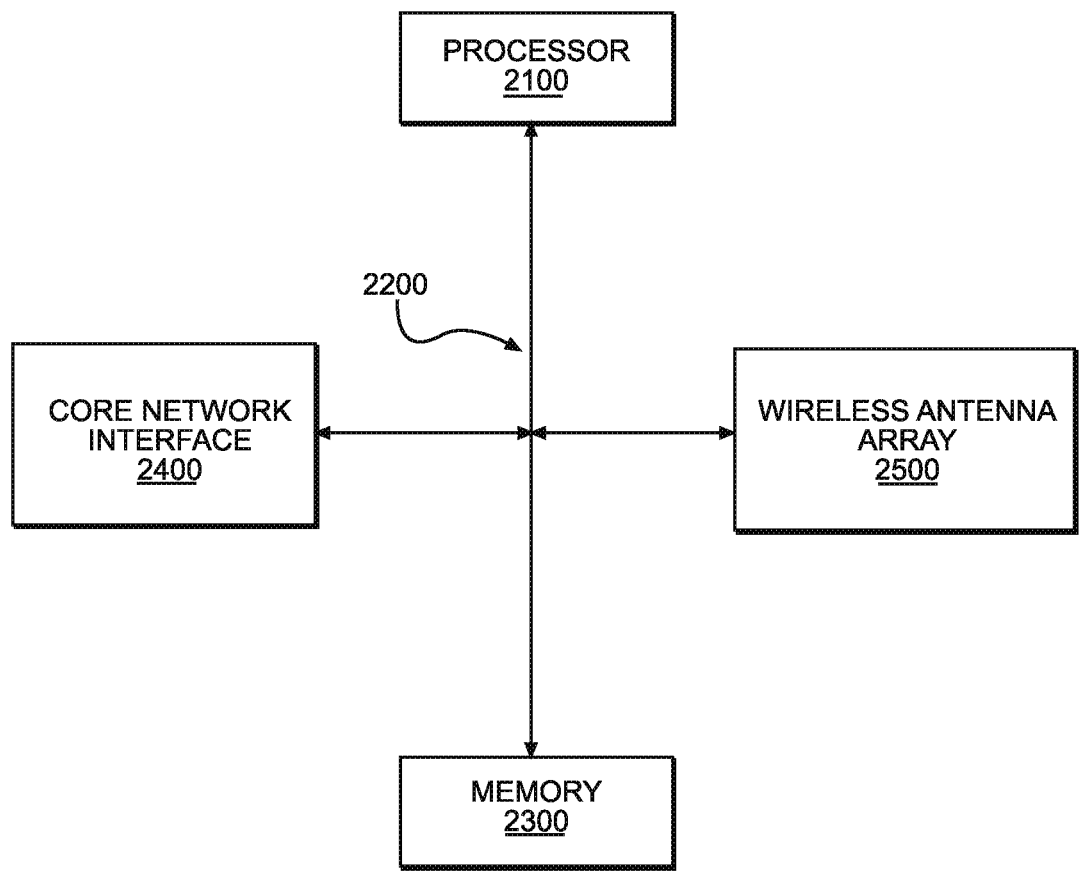
FIG. 2 illustrates a block diagram of an example HAPS network node according to at least one example embodiment.

FIG. 2 illustrates a block diagram of an example HAPS network device according to at least one example embodiment. The HAPS network device 2000 may correspond to the HAPS network device 100 of FIG. 1, but is not limited thereto.

Referring to FIG. 2, a HAPS network device 2000 may include processing circuitry, such as the at least one processor 2100, a communication bus 2200, a memory 2300, at least one core network interface 2400, and/or at least one wireless antenna array 2500, but the example embodiments are not limited thereto. The memory 2300 may include various program code including computer executable instructions.

In at least one example embodiment, the HAPS network device 2000 may include processing circuitry, such as at least one processor 2100 (and/or processor cores, distributed processors, networked processors, etc.), which may be configured to control one or more elements of the HAPS network device 2000, and thereby cause the HAPS network device 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire HAPS network device 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the HAPS network device 2000, such as the methods discussed in connection with FIGS. 4 to 7, the at least one core network interface 2400, and/or the at least one wireless antenna array 2500, etc. Such software elements may be loaded from a non-transitory computer-readable storage medium independent of the memory 2300, using a drive mechanism (not shown) connected to the HAPS network device 2000, or via the at least one core network interface 2400, and/or the at least one wireless antenna array 2500, etc.

In at least one example embodiment, the communication bus 2200 may enable communication and data transmission/reception to be performed between elements of the HAPS network device 2000. The bus 2200 may be implemented using a high-speed serial bus, a parallel bus, and/or any other appropriate communication technology. According to at least one example embodiment, the HAPS network device 2000 may include a plurality of communication buses (not shown), such as an address bus, a data bus, etc.

The HAPS network device 2000 may operate as at least one RAN node by itself or in combination with a core network gateway, such as core network gateway 300, but the example embodiments are not limited thereto. The HAPS network device 2000 may operate as, for example, a 4G RAN, a 5G RAN, a 6G RAN, etc., and may be configured to schedule resource blocks for UE devices connected to the HAPS network device 2000.

For example, the HAPS network device 2000 may allocate time-frequency resources of a carrier (e.g., resource blocks with time and frequency dimensions) based on operation on the time domain (e.g., time division duplexing) and the frequency domain (e.g., frequency division duplexing). In the time domain context, the HAPS network device 2000, alone or in combination with the core network, (e.g., RAN node) will allocate a carrier (or subbands of the carrier) to one or more UEs (e.g., UE 200, etc.) connected to the HAPS network device 2000 during designated upload (e.g., uplink (UL)) time periods and designated download (e.g., downlink (DL)) time periods. When there are multiple UEs connected to the HAPS network device 2000, the carrier is shared in time such that each UE is scheduled by the HAPS network device 2000, and the HAPS network device 2000 allocates each UE with their own uplink time and/or downlink time. In the frequency domain context and/or when performing spatial domain multiplexing of UEs (e.g., MU MIMO, etc.), the HAPS network device 2000 will allocate separate frequency subbands of the carrier to UEs simultaneously served by the HAPS network device 2000, for uplink and/or downlink transmissions. Communication (e.g., data transmission and/or reception) between the UE and the HAPS network device 2000 may occur on a radio frame basis in both the time domain and frequency domain contexts. The minimum resource unit for allocation and/or assignment by the HAPS network device 2000 to a particular UE device corresponds to a specific downlink/uplink time slot (e.g., one OFDM symbol, one slot, one minislot, one subframe, etc.) and/or a specific downlink/uplink resource block (e.g., twelve adjacent subcarriers, a frequency subband, etc.).

For the sake of clarity and consistency, the example embodiments will be described as using the time domain, but the example embodiments are not limited thereto and the example embodiments may operate in the frequency domain.

The HAPS network device 2000 may also include at least one core network interface 2400, and/or at least one wireless antenna array 2500. The at least one wireless antenna array 2500 may include an associated array of radio units (not shown) and may be used to transmit the wireless signals in accordance with a radio access technology, such as 4G LTE wireless signals, 5G NR wireless signals, etc., to at least one UE device, such as UE 200, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The HAPS network device 2000 may communicate with a core network (e.g., backend network, backbone network, etc.) of the wireless network via a core network interface 2400. The core network interface 2400 may be a wireless network interface and may enable the HAPS network device 2000 to communicate and/or transmit data to and from network devices on the backend network, such as a core network gateway 300, a Data Network, etc., thereby allowing the UEs connected to the HAPS network device 2000 to communicate and/or transmit data using the backend network to other networks, such as the Internet, telephone networks, VoIP networks, etc.

Additionally, the HAPS network device 2000 may determine wireless network characteristics and/or wireless network conditions associated with the connections between the at least one UE device and the HAPS network device 2000 through feedback signaling from the at least one UE device. For example, the at least one wireless antenna array 2500 may be used to receive from the at least one UE device channel state information of the individual beams, beam layers, and/or channel(s) operated by the HAPS network device 2000 in one or more radio technologies, e.g. reference signal received power (RSRP), a received signal strength indicator (RSSI), receive signal-to-interference-plus-noise ratio (SINR), and/or interference level readings, etc., associated with the connected UEs, but the example embodiments are not limited thereto.

While FIG. 2 depicts an example embodiment of a HAPS network device 2000, the NTN device is not limited thereto, and may include additional and/or alternative architectures that may be suitable for the purposes demonstrated.

Figure 3:
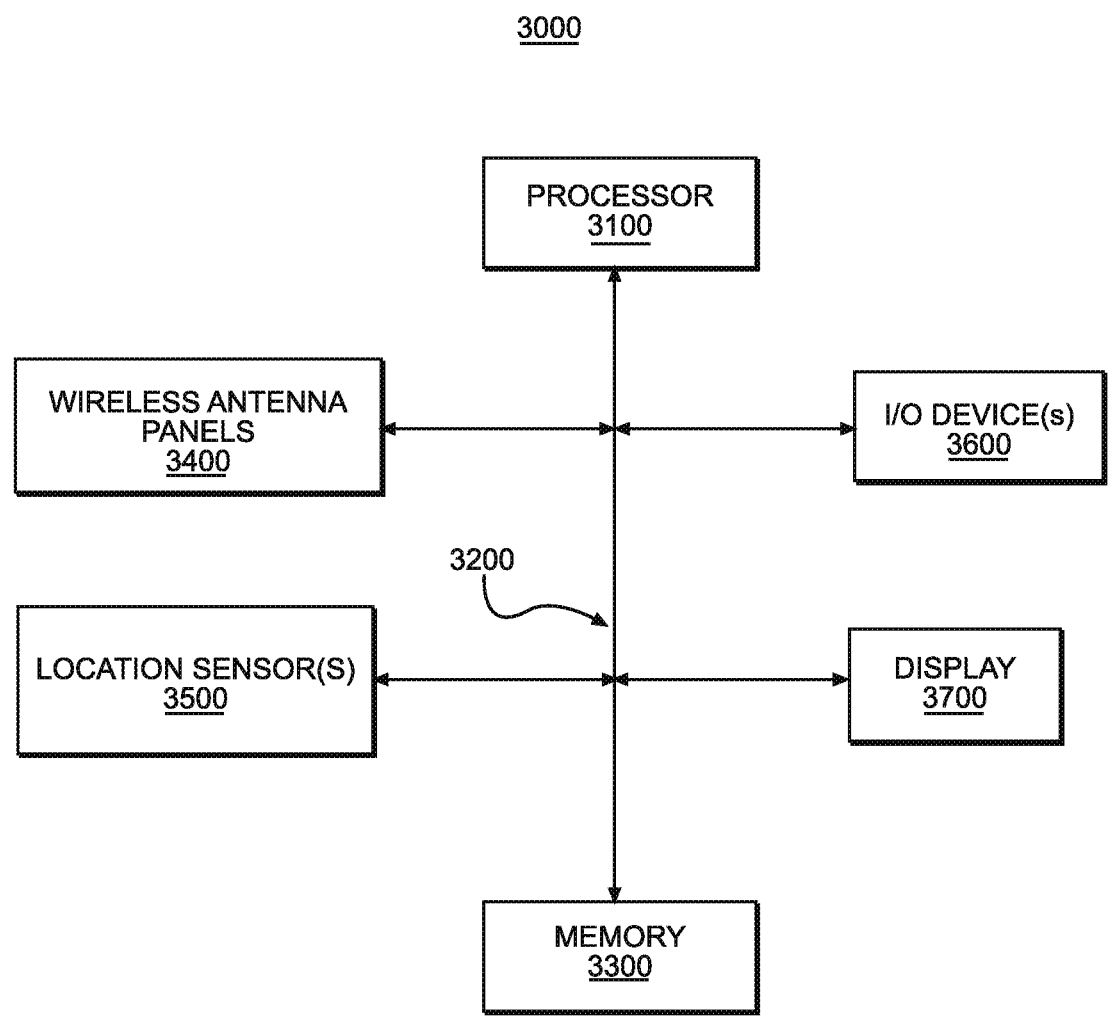
FIG. 3 illustrates a block diagram of an example UE device according to at least one example embodiment.

FIG. 3 illustrates a block diagram of an example UE device according to at least one example embodiment. The example UE device 3000 of FIG. 3 may correspond to the UE device(s) 200 of FIG. 1, but the example embodiments are not limited thereto.

Referring to FIG. 3, a UE 3000 may include processing circuitry, such as at least one processor 3100, at least one communication bus 3200, a memory 3300, a plurality of wireless antennas and/or wireless antenna panels 3400, at least one location sensor 3500, at least one input/output (I/O) device 3600 (e.g., a keyboard, a touchscreen, a mouse, a microphone, a camera, a speaker, etc.), and/or a display panel 3700 (e.g., a monitor, a touchscreen, etc.), but the example embodiments are not limited thereto. According to some example embodiments, the UE 3000 may include a greater or lesser number of constituent components, and for example, the UE 3000 may also include a battery, one or more additional sensors (e.g., thermometers, humidity sensors, pressure sensors, motion sensors, accelerometers, etc.), actuators, a single wireless antenna and/or a single wireless antenna panel, etc. Additionally, the location sensor 3500, the display panel 3700, and/or I/O device 3600, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIGS. 4 and 7, the wireless antenna 3400, and/or the location sensor 3500, etc. Such software elements may be loaded from a non-transitory computer-readable storage medium independent of the memory 3300, using a drive mechanism (not shown) connected to the UE 3000, or via the wireless antenna 3400, etc. Additionally, the memory 3300 may store network configuration information, such as system information, etc., for communicating with at least on RAN node, e.g., HAPS network device 100, etc., accessing a wireless network, etc., but the example embodiments are not limited thereto.

In at least one example embodiment, the at least one communication bus 3200 may enable communication and data transmission/reception to be performed between elements of the UE 3000. The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include at least one wireless antenna panel 3400, but is not limited thereto. The at least one wireless antenna panel 3400 may include at least one associated radio unit (not shown) and may be used to transmit wireless signals in accordance with at least one desired radio access technology, such as 4G LTE, 5G NR, Wi-Fi, etc. The at least one wireless antenna panel 3400 may be located at the same or different physical locations on the body of the UE 3000, may have the same or different orientations, may operate in the same or different frequency ranges, may operate in accordance with the same or different radio access technology, etc. According to some example embodiments, the at least one wireless antenna panel 3400 may be a single antenna, or may be a plurality of antennas, etc.

The UE 3000 may also include at least one location sensor 3500 to calculate the absolute and/or relative location of the UE 3000. The at least one location sensor 3500 may be a GNSS sensor, such as a GPS sensor, a GLONASS sensor, a Galileo sensor, a Beidou sensor, etc., an inertial movement sensors, such as a gyroscope, an accelerometer, an altimeter, etc. Additionally, the location sensor 3500 and/or the processor 3100 may also use cellular network based positioning services, such as a cellular network location service (e.g., a location management function (LMF) service of the core network), an Assisted-GPS (A-GPS) function, etc., to determine the current location of the UE 3000. In some example embodiments, the cellular network location service may also include a network based positioning solution, such as downlink time difference of arrival (DL-TDOA), an uplink time difference of arrival (UL-TDOA), an enhanced cell ID (E-CID), an uplink angle of arrival (UL-AoA), a downlink angle of departure (DL-AoD), a multi-cell round trip time (multi-RTT), etc., or any combination thereof. In some additional example embodiments, the cellular network location solution may also be run at the UE side (i.e., in UE based mode). However, the example embodiments are not limited thereto, and other location determining techniques may be used as well.

While FIG. 3 depicts an example embodiment of a UE 3000, the UE device is not limited thereto, and may include additional and/or alternative architectures that may be suitable for the purposes demonstrated.

Figure 4:
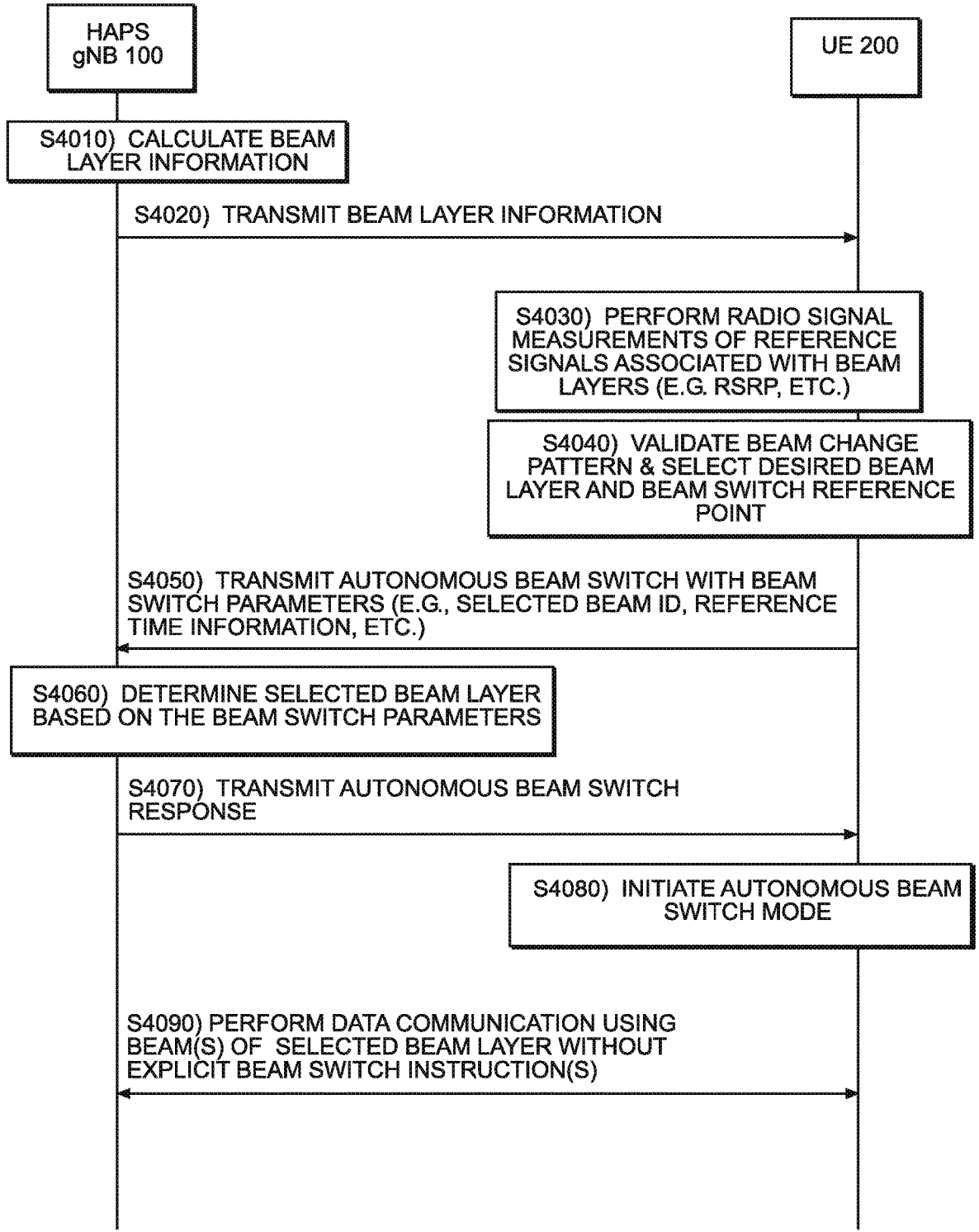
FIG. 4 illustrates a transmission flow diagram according to at least one example embodiment.
Figure 5A:
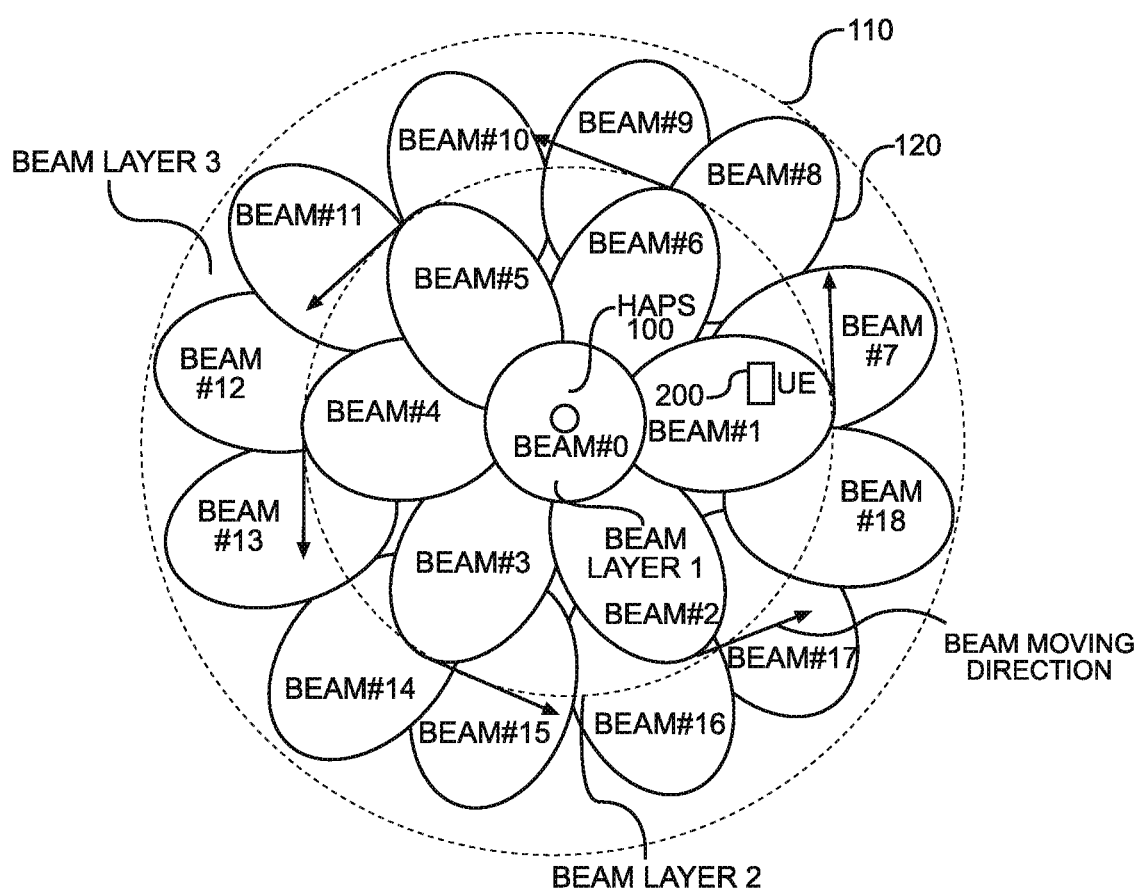
FIG. 5A illustrates an example diagram of a HAPS cell coverage area according to at least one example embodiment.
Figure 5B:
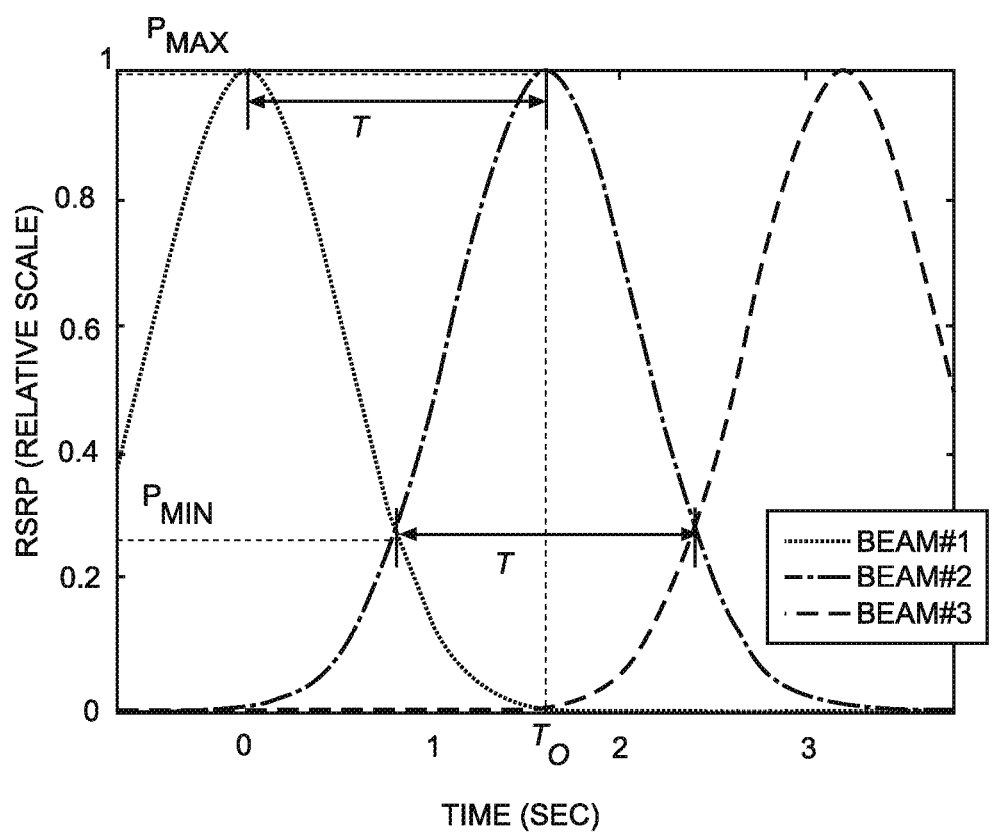
FIG. 5B illustrates an example radio signal measurement of a plurality of beams of a beam layer according to at least one example embodiment.

FIG. 4 illustrates a transmission flow diagram between at least one HAPS network device and at least one UE according to at least one example embodiment. The HAPS network device may be a regenerative or transparent RAN node, but the example embodiments are not limited thereto. FIG. 5A illustrates an example diagram of a HAPS cell coverage area according to at least one example embodiment. FIG. 5B illustrates an example radio signal measurement of a plurality of beams of a beam layer according to at least one example embodiment. FIG. 5C illustrates an example table of beam layer information according to at least one example embodiment.

Referring now to FIGS. 4 and 5A, according to at least one example embodiment, at least one HAPS network device 100 may act as a RAN node, such as a gNB node, an ng-eNB node, etc., but the example embodiments are not limited thereto. The HAPS network device 100 may be an aerial platform (e.g., a manned aircraft, UAV, balloon, blimp, etc.) and may transmit (e.g., beam, emit, etc.) a cell coverage area 110 according to at least one example embodiment. The cell coverage area 110 may correspond to a single network cell, but the example embodiments are not limited thereto, and for example may include a plurality of network cells. Additionally, the cell coverage area 110 may comprise a plurality of individual beam coverage areas 120 corresponding to individual beams transmitted by a wireless antenna array of the HAPS network device 100. The individual beams/individual beam coverage areas 120 may be assigned, associated with, and/or correspond to beam identifiers (IDs) (e.g., reference signal IDs, etc.). For example, as shown in FIG. 5A, there may be 19 individual beams included in the cell coverage area 110 and may be referred to as beam #0 to beam #18, but the example embodiments are not limited thereto.

Further, the individual beam coverage areas 120 may be organized into at least one beam layer (e.g., layer, etc.) of the cell coverage area 110. For example, as shown in FIG. 5A, the cell coverage area 110 may include 3 beam layers, e.g., beam layer 1, beam layer 2, and beam layer 3, but the example embodiments are not limited thereto, and the number of beam layers may be greater or lesser than 3. As shown in FIG. 5A, beam layer 1 may include a single beam #0, beam layer 2 may include six beams, e.g., beams #1 to #6, and beam layer 3 may include 12 beams, e.g., beams #7 to beam #18, but the example embodiments are not limited thereto. According to other example embodiments, the total number of beams may be greater or less than 19, and the number of individual beams included in any particular beam layer may be greater or less than the number of individual beams shown in FIG. 5A.

According to at least one example embodiment, the direction of the individual beam coverage areas 120 may be fixed relative to the HAPS network device 100, and accordingly, when the HAPS network device 100 is flying along a desired flight pattern (e.g., a circular flight pattern, etc.), the footprint of the individual beams may rotate in the same direction as the HAPS network device 100. For example, if the HAPS network device 100 is flying counter-clockwise in a circle with a 3 km radius at a height of approximately 20 km, each of the individual beams 120 will have a beam footprint of approximately 26 km radius, and the individual beams 120 in beam layers 2 and 3 will likewise rotate in the counter-clockwise direction as indicated by the arrows shown in FIG. 5A, but the general outline of the cell coverage area 110 will appear to be stationary to any UE, e.g., UE 200, etc., located within the cell coverage area 110. For example, assuming the UE 200 illustrated in FIG. 5A is stationary, the UE 200 may initially be located within the individual beam coverage area associated with beam #1 and beam layer 2, but as the HAPS network device 100 flies in a counter-clockwise direction along its desired flight pattern, the individual beam coverage areas covering the location of the UE 200 will also rotate in the clockwise direction, and the UE 200 will be located within the individual beam coverage areas of beam #2, beam #3, beam #4, beam #5, and beam #6, before returning to beam #1 as the HAPS network device 100 completes one revolution of its flight pattern, etc., but the example embodiments are not limited thereto.

Referring back to FIG. 4, in operation S4010, the HAPS network device 100 may determine and/or calculate beam layer information associated with the cell coverage area 110 based on the desired (e.g., known) flight pattern of the HAPS network device 100, the desired (e.g., known) speed of the HAPS network device 100, and the configuration of the wireless antenna array (e.g., the desired configuration, arrangement, and/or layout of the individual beams/individual beam coverage areas, etc.) of the HAPS network device 100. According to at least one example embodiment, the HAPS network device 100 may determine, calculate and/or generate the beam layer information by compiling a list of the at least one beam layer included in the cell coverage area 110, a list of beam IDs associated with each of the beam layers (e.g., an ordered list of the beam IDs associated with each of the beam layers, a beam change pattern, etc.), and/or a determined and/or calculated beam dwell time associated with each of the beam layers, etc., but the example embodiments are not limited thereto.

According to some example embodiments, each of the lists of beam IDs associated with a particular beam layer may be an ordered list and may indicate a "beam change pattern" for the respective beam layer. For example, as shown in FIG. 5C, the list of beam IDs may include a beam list for beam layer 1 which may include a single beam with a beam ID of "ID_0". For the list of beam IDs for beam layer 2, the list may include beam IDs "ID_1," ID_2," "ID_3," "ID_4," "ID_5," and "ID_6." The order of the list may indicate the rotation order of the individual beams/individual beam coverage areas for the corresponding beam layer. Additionally, the beam ID may correspond to a reference signal ID corresponding to the individual beam signals, and may be broadcast and/or signaled by the HAPS network device 100. For example, according to the 5G NR wireless standard, each beam may transmit a reference signal associated with each beam, such as Synchronization Signal Block (SSB) and Channel State Information Reference Signal (CSI-RS), etc., which may be used by the UE 200 to determine a signal strength and/or power associated with each of the beams, but the example embodiments are not limited thereto.

Further, according to some example embodiments, the HAPS network device 100 may determine, calculate, and/or identify a beam dwell time associated with each individual beam included in a particular and/or desired beam layer. For example, assuming the HAPS network device 100 is flying at a constant speed v in a circular flight pattern with a radius of r, the beam dwell time may be determined, calculated, and/or identified using the following formula:

$$T=2\pi r/(Nv) \quad \text{[Equation 1]}$$

where T is the dwell time of one beam in a layer of N beams.

For example, for beam layer 1, because beam #0 is the center beam relative to the HAPS network device 100, the dwell time T0 is equal to ∞ and may not need to be signaled, but the example embodiments are not limited thereto. For beam layer 2, assuming v=120 km/hr, and r=3 km, the beam dwell time T2 for beam layer 2 is approximately 94.25 secs and the beam dwell time T3 for beam layer 3 is 47.12 secs, but the example embodiments are not limited thereto. Because the size of each individual beam coverage area is the same, and the flight pattern and the speed of the HAPS network device 100 is constant, the beam dwell time determined, calculated, and/or identified for a beam layer is applicable to each individual beam included in that beam layer (e.g., every beam included in beam layer 2 has a beam dwell time of 94.25 secs, and every beam included in beam layer 3 has a beam dwell time of 47.12 secs), however the example embodiments are not limited thereto, and non-constant speeds and/or flight patterns may be used as well.

Returning to FIG. 4, after the HAPS network device 100 completes the determination and/or calculation of the beam layer information, in operation S4020, the HAPS network device 100 transmits the beam layer information to the UE 200. According to at least one example embodiment, the beam layer information may be broadcast as a SIB message and/or signaled as a RRC signal, but the example embodiments are not limited thereto.

In operation S4030, the UE 200 may perform radio signal measurements on references signals associated with the beam layers of the cell coverage area 110 to select and/or determine a best or strongest beam layer to use in response to receiving the beam layer information. For example, the UE 200 may perform power measurements and/or signal strength measurements to select and/or determine the best or strongest beam layer to use, which corresponds to the individual beam coverage areas that the UE 200 may be located within. The radio signal measurements may be a reference signal received power (RSRP) measurement, a received signal strength indicator (RSSI) measurement, a signal reference signal received quality (RSRQ) measurement, a receive signal-to-interference-plus-noise ratio (SINR) measurement, and/or interference level readings, on a synchronization signal (SS) and/or channel state information (CSI) reference signals transmitted by the HAPS network device 100 in the individual beams 120, but the example embodiments are not limited thereto. For example, if the HAPS network device 100 implements the 5G NR standard, the Layer 1 RSRP (L1-RSRP) measurement may be used for the autonomous beam selection by the UE 200, but the example embodiments are not limited thereto. The UE 200 may perform the power and/or signal quality measurements for each of the beam layers listed in the beam layer information in order to determine which beam layer provides the strongest and/or highest signal for data communication between the UE 200 and the HAPS network device 100.

Further, as shown in FIG. 5B, the UE 200 may also determine a reference a reference time to which corresponds to the highest or maximum measurement, $P_{MAX}$, occurred for the "best" or "strongest" reference signal, a lowest or minimum measurement, $P_{MIN}$, for the "best" or "strongest" reference signal, as well as the time period T between the occurrences of the highest or maximum measurements which corresponds to the beam change reference time, etc., but the example embodiments are not limited thereto. The $P_{MIN}$ value may occur at and/or correspond to points in time where the individual beam coverage area transitions from a first beam coverage area (e.g., current beam coverage area, initial beam coverage area, etc.) to a second beam coverage area (e.g., the next beam coverage area, etc.) or in other words the UE 200 is covered by a different beam coverage area. The values for the reference times may be indicated as time values, slot numbers, subframe numbers, etc., but the example embodiments are not limited thereto. The one or more of the collected information may be referred to as "beam switch parameters" and/or beam switch parameter information, etc., but the example embodiments are not limited thereto.

In operation S4040, the UE 200 may also validate and/or confirm the list of beam IDs for the selected beam layer (e.g., the ordered list of beam IDs corresponding to the selected beam layer, beam change pattern information associated with the selected beam layer, etc.) included in the beam layer information received from the HAPS network device 100 to the UE 200's own observations of the beam IDs (e.g., the ordered list of beam IDs, beam change pattern information, etc.) received on the ground by storing the order of beam IDs received by the UE 200 for the selected beam layer and comparing the stored order of observed beam IDs to the list of beam IDs (and/or beam change pattern information) for the selected beam layer included in the beam layer information.

The two beam change patterns may not match for several reasons, such as the beam layer information transmitted by the HAPS network device 100 being out of date due to a change in the flight pattern and/or a change in the flight speed of the HAPS network device 100, a change in the location of the UE 200 (e.g., the UE device is moving), etc., but the example embodiments are not limited thereto. If the UE 200 determines that the two lists of beam IDs (e.g., the received and observed lists of beam IDs, the received and observed beam change patterns, etc.) do not match, or in other words, the list of beam IDs (e.g., the beam change pattern) is not validated and/or confirmed, etc., the UE 200 may 1) use legacy beam management techniques to allow the HAPS network device 100 to manage which beam the UE 200 uses to communicate with the HAPS network device 100 (e.g., the HAPS network device 100 manages the beam switching of the UE 200 through explicit instructions and/or signaling, etc.); 2) wait for new beam layer information to be transmitted by the HAPS network device 100; and/or 3) perform an update of the beam switch parameters. Options 2 and 3 will be discussed in more detail in connection with FIGS. 6 and 7, respectively.

Referring again to operation S4040, if the UE 200 determines that the two lists of beam IDs (e.g., beam change patterns) match, in operation S4050, the UE 200 may transmit an autonomous beam switch request to the HAPS network device 100. The autonomous beam switch request may include one or more of the beam switch parameters, such as the selected beam ID (and/or the selected beam layer ID), the reference time information, the beam change reference time, and/or the $P_{MAX}$, and/or $P_{MIN}$ values, etc., but the example embodiments are not limited thereto. According to at least one example embodiment, the UE 200 may only transmit a subset of the beam switch parameter information, such as the selected beam ID (and/or the selected beam layer ID), and the reference time information, etc., with the autonomous beam switch request in order to decrease the amount of signaling overhead required for the autonomous beam switch procedure.

According to at least one example embodiment, in operation S4060, the HAPS network device 100 may determine and/or confirm the beam layer selected by the UE 200 based on the received beam switch parameters. For example, if the UE 200 transmitted the selected beam ID (e.g., the ID of the individual beam which measured the strongest, etc.), the HAPS network device 100 may determine the beam layer associated with the selected beam ID and identify the determined beam layer as the beam layer selected by the UE 200.

Further, the HAPS network device 100 may determine and/or infer the approximate location and/or relative direction of the UE 200 and determine which individual beam coverage area 120 is currently over the UE 200's location based on the selected beam ID, the beam dwell time associated with the selected beam ID, the reference time information, and/or a current time, etc., but the example embodiments are not limited thereto. More specifically, the HAPS network device 100 may determine the approximate location and/or relative direction of the UE 200 by determining the location of the selected beam at the point in time indicated by the reference time information, and then determine which beam of the selected beam layer is currently covering and/or over the determined location at a current time based on the beam dwell time associated with the selected beam ID and the amount of time that has elapsed since the reference time information, but the example embodiments are not limited thereto.

In operation S4070, the HAPS network device 100 may transmit a response to the autonomous beam switch request message (e.g., a confirmation message, an instruction, an acknowledgement, an indication, etc.) instructing the UE 200 and/or otherwise indicating information to the UE 200 to enable the UE 200 to begin autonomous beam switch mode using the beam layer selected by the UE 200, without receiving explicit beam switch instructions and/or messaging from the HAPS network device 100, to reduce the amount of signaling and/or overhead associated with the beam switching protocol.

In operation S4080, the UE 200 may begin autonomous beam switch mode using the selected beam layer, and in operation S4090, the HAPS network device 100 and the UE 200 may enable and/or begin communication (e.g., data transmission and/or reception) using the individual beams of the selected and/or desired beam layer, wherein both the UE 200 and HAPS network device 100 will switch over from a current beam to the next beam in the beam change pattern of the selected beam layer autonomously without explicit beam change (e.g., beam handover, etc.) signaling being transmitted by either device.

The autonomous beam switching mode is further advantageous because it reduces the beam-switch signaling overhead required from the HAPS network device without performing beam steering, and allows the HAPS network device to provide continuous service to the UE device without excessive connection interruptions, etc. Moreover, the autonomous beam switching mode improves the battery life and/or reduces the power consumption of the UE device and/or the HAPS network device by reducing and/or eliminating the need for the UE device to perform constant CSI measurement and reporting as required by legacy beam management protocols, such as the 5G NR beam management protocol.

Figure 6:
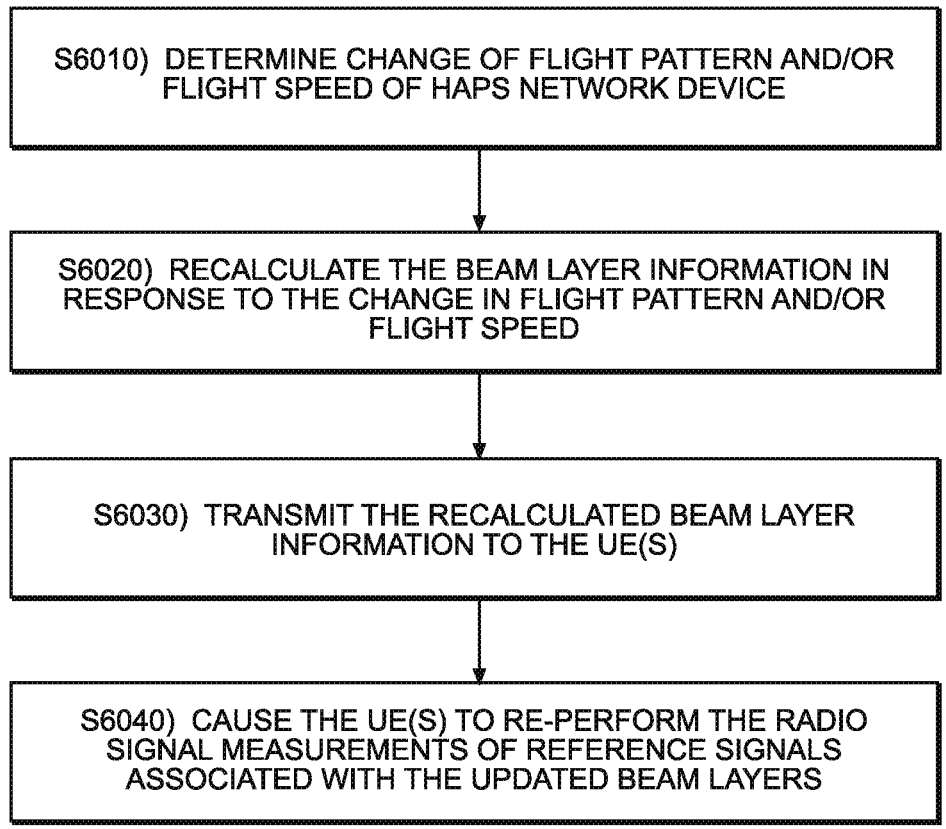
FIG. 6 is an example flowchart illustrating a method for updating beam layer information according to at least one example embodiment.

Now referring to FIG. 6, FIG. 6 depicts an example flowchart illustrating a method for updating beam layer information by the HAPS network device according to at least one example embodiment. According to at least one example embodiment, in operation S6010, the HAPS network device 100 may determine that a change in the flight pattern and/or flight speed of the HAPS network device 100 has occurred and/or will occur. For example, if the HAPS network device 100 is an autonomous aerial vehicle (e.g., a UAV, etc.) the HAPS network device 100 may receive instructions from an external source, such as the DN or the core network, to change the flight pattern and/or flight speed, etc., for example due to a desired change in the location being served by the HAPS network device 100, etc., but the example embodiments are not limited thereto. As another example, the HAPS network device 100 may autonomously change its flight pattern and/or flight speed due to factors, such as environmental factors (e.g., severe winds/weather, changes in air current patterns, etc.), etc., but the example embodiments are not limited thereto. As a third example, the HAPS network device 100 may determine that a change in the flight pattern and/or flight speed of the HAPS network device 100 has occurred based on manual changes made by a pilot of the HAPS network device 100, etc. However, the example embodiments are not limited thereto, and the HAPS network device 100 may determine that a change of flight pattern and/or flight speed has occurred based on other factors.

Next, in operation S6020, the HAPS network device 100 may redetermine, recalculate and/or update the beam layer information, such as the beam dwell time, etc., for each of the beam layers in response to the determination that the HAPS network device 100 has changed flight pattern and/or flight speed due to the previously determined and/or calculated beam layer information being out of date and/or inapplicable. At operation S6030, the HAPS network device 100 may transmit the redetermined, recalculated, and/or updated beam layer information to any UE devices 200 within the cell coverage area 110 of the HAPS network device 100. In response to the transmission of the redetermined, recalculated, and/or updated beam layer information, in operation S6040, the transmission of the redetermined, recalculated, and/or updated beam layer information to the UE device(s) 200 may cause the UE device 200 to re-perform the radio signal measurements of the reference signals associated with the redetermined, recalculated, and/or updated beam layer information (e.g., perform operation S4030, etc., of FIG. 4, again), but the example embodiments are not limited thereto.

Figure 7:
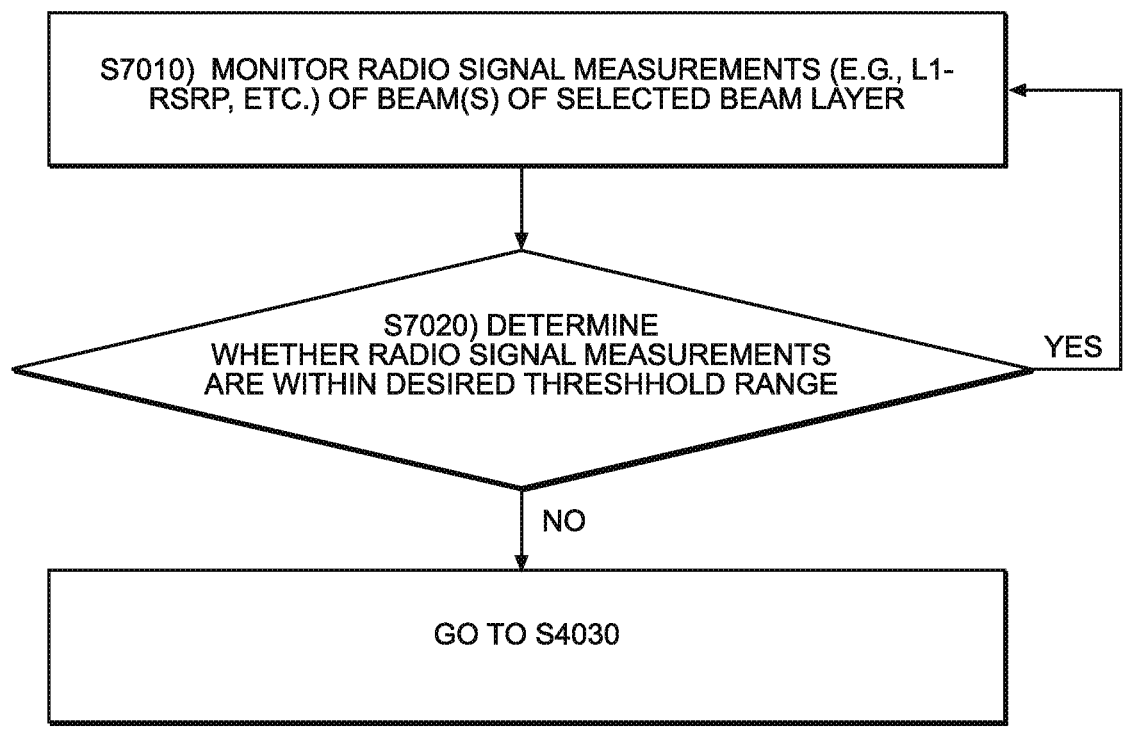
FIG. 7 is an example flowchart illustrating a method for updating beam switch parameters according to at least one example embodiment.

Referring now to FIG. 7, FIG. 7 is an example flowchart illustrating a method for updating beam switch parameters performed by a UE device according to at least one example embodiment. According to at least one example embodiment, the UE device 200 may perform the method of updating the beam switch parameter information may be performed by the UE device 200 on a periodic basis of a desired periodic interval and/or may be performed in response to the UE device 200 detecting that its position has changed using the location sensor 3500 of the UE device, etc.

According to at least one example embodiment, in operation S7010, the UE device 200 may monitor (e.g., periodically monitor) the radio signal measurements of at least one individual beam of the selected beam layer. For example, the UE device 200 may perform L1-RSRP measurements on the CSI reference signal of at least one individual beam of the selected beam layer, perform SS-RSRP measurements on the SS reference signal of the individual beams of the selected beam layer, etc., to determine the P(t) value of the individual beams of the selected beam layer, but the example embodiments are not limited thereto. Based on the performed radio signal measurements, in operation S7020, the UE device 200 may determine whether the radio signal measurements are within an expected range (e.g., a desired threshold range, a controlled range, etc.). For example, the UE device 200 may compare the measured P(t) value against the expected $P_{MAX}$ and $P_{MIN}$ values determined from S4030, and may determine whether the P(t) is between the $P_{MAX}$ and $P_{MIN}$ values, or in other words, whether $P_{MIN} \leq P(t) \leq P_{MAX}$. If the P(t) is within the expected range (e.g., between the $P_{MAX}$ and $P_{MIN}$ values), then the monitored individual beam is within the expected radio signal power and/or quality values and the UE device 200 may continue to use the selected beam layer for data communication with the HAPS network device 100, and the UE 200 may return to operation S7010.

However, if the P(t) is not within the expected range (e.g., between the $P_{MAX}$ and $P_{MIN}$ values), then the monitored individual beam is not within the expected radio signal power and/or quality values, and the UE device 200 may return to operation S4030 of FIG. 4 and may perform the radio signal measurements of the reference signals of each of the beam layers of the cell coverage area 110 to select a new beam layer to use for the autonomous beam switch communication.

Various example embodiments are directed towards a system, apparatus, method, and non-transitory computer readable medium for providing autonomous beam switching for UE devices within a cell coverage area of a moving HAPS network device. Accordingly, one or more of the example embodiments provide methods for allowing autonomous beam switching by the UE devices and the HAPS network device without the transmission and/or use of explicit beam switch signaling and/or instructions between the HAPS network device and the UE devices, thereby reducing the signaling overhead for providing cell coverage to the UE devices using the moving HAPS network device, thus improving the battery life and/or reducing the power consumption of the UE devices and/or the HAPS network device. Further, one or more of the example embodiment also reduce the number of handover operations and/or connection drops experienced by the UE devices, thereby improving the cell service quality provided by the HAPS network device.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A high altitude platform station (HAPS) network device comprising:
   a wireless antenna array configured to communicate with at least one user equipment (UE) located within a cell coverage area associated with the HAPS network device, the cell coverage area including a plurality of beam layers and a plurality of beams, each of the plurality of beam layers including at least one beam of the plurality of beams;
   a memory storing computer readable instructions; and
   processing circuitry configured to execute the computer readable instructions to cause the HAPS network device to,
      determine beam layer information corresponding to the plurality of beam layers, the beam layer information including layer identifiers (ID) associated with each beam layer of the plurality of beam layers, and beam IDs associated with each beam included in each of the beam layers;
      transmit the beam layer information to the at least one UE;
      receive an autonomous beam switch request from the at least one UE in response to the transmitted beam layer information, the request including beam switch parameters;
      determine a selected beam layer based on the beam switch parameters; and
      enable communication with the at least one UE using the selected beam layer.

2. The HAPS network device of claim 1, wherein a direction of each beam of the plurality of beams is fixed relative to the HAPS network device.

3. The HAPS network device of claim 1, wherein the processing circuitry is further configured to cause the HAPS network device to,
   determine a beam dwell time for each of the plurality of beam layers, and
   transmit the beam layer information to the at least one UE, the beam layer information including the plurality of layer IDs, a plurality of beam IDs associated with a respective beam layer of the plurality of beam layers, and the plurality of beam dwell times.

4. The HAPS network device of claim 1, wherein the beam switch parameters include a selected beam ID identifying a beam selected by the UE, and reference time information associated with the selected beam.

5. The HAPS network device of claim 4, wherein the processing circuitry is further configured to cause the HAPS network device to:
   determine the selected beam layer based on the selected beam ID;
   select a transmission beam from the at least one beam associated with the determined beam layer based on the reference time information, a beam dwell time corresponding to the determined beam layer, and a current time; and
   enable the communication with the at least one UE using the transmission beam.

6. The HAPS network device of claim 1, wherein the processing circuitry is further configured to cause the HAPS network device to:
   transmit an acknowledgement to the at least one UE in response to the autonomous beam switch request, the acknowledgement indicating to the at least one UE to activate autonomous beam switch mode.

7. The HAPS network device of claim 1, wherein the HAPS network device is configured to fly in a desired flight pattern at a desired speed, the flying in the desired flight pattern and the desired speed causing each beam layer of the plurality of beam layers to have different beam dwell times from each other.

8. The HAPS network device of claim 7, wherein the processing circuitry is further configured to cause the HAPS network device to:
   update the beam layer information based on a change in the desired flight pattern or a change in the desired speed of the HAPS network device; and
   transmit the updated beam layer information to the at least one UE.

9. A user equipment (UE) comprising:
   a memory storing computer readable instructions; and
   processing circuitry configured to execute the computer readable instructions to cause the UE to,
   receive beam layer information from a high altitude platform station (HAPS) network device, the beam layer information including information corresponding to a plurality of beam layers associated with a cell coverage area of the HAPS network device, the cell coverage area further including a plurality of beams, and each of the plurality of beam layers including at least one beam of the plurality of beams, the beam layer information including layer identifiers (ID) associated with each beam layer of the plurality of beam layers, and beam IDs associated with each beam included in each of the beam layers,
   perform radio signal measurements associated with each of the plurality of beam layers,
   select a desired beam layer from the plurality of beam layers based on the radio signal measurements,
   transmit an autonomous beam switch request to the HAPS network device, the request including beam switch parameters associated with the selected beam layer, and
   enable communication with the HAPS network device using the selected beam layer.

10. The UE of claim 9, wherein the processing circuitry is further configured to cause the UE to:
   observe a beam change pattern of the desired beam layer based on the performed radio signal measurements;
   validate the observed beam change pattern based on the beam layer information; and
   transmit the autonomous beam switch request to the HAPS network device based on results of the validation of the observed beam change pattern.

11. The UE of claim 9, wherein the processing circuitry is further configured to cause the UE to:
   receive an acknowledgement from the HAPS network device in response to the autonomous beam switch request; and
   activate autonomous beam switch mode in response to the acknowledgement.

12. The UE of claim 9, wherein the processing circuitry is further configured to cause the UE to:
   measure a reference signal strength for the at least one beam of each of the plurality of beam layers;

determine a strongest beam based on the measured reference signal strengths;
select a beam layer associated with the strongest beam as the desired beam layer;
determine a maximum signal strength and a minimum signal strength associated with the strongest beam; and
determine reference time information based on a time associated with the maximum signal strength of the strongest beam.

13. The UE of claim 12, wherein the beam switch parameters include a selected beam ID identifying the strongest beam, and the reference time information.

14. The UE of claim 12, wherein
each beam layer of the plurality of beam layers is associated with a beam dwell time; and
the beam layer information further includes the plurality of beam dwell times.

15. The UE of claim 14, wherein the processing circuitry is further configured to cause the UE to:
autonomously select a transmission beam from the at least one beam associated with the selected beam layer based on the reference time information, the beam dwell time corresponding to the selected beam layer, and a current time; and
enable the communication with the HAPS network device using the selected transmission beam.

16. The UE of claim 9, wherein the processing circuitry is further configured to cause the UE to:
monitor a reference signal strength of the at least one beam of the desired beam layer;
determine whether the monitored reference signal strengths of the at least one beam are within an expected range;
perform updated radio signal measurements associated with each of the plurality of beam layers based on results of the determining;
select a new desired beam layer from the plurality of beam layers based on the updated radio signal measurements;
transmit a new autonomous beam switch request to the HAPS network device, the request including updated beam switch parameters associated with a selected new beam layer; and
enable the communication with the HAPS network device using the selected new beam layer.

17. A method of operating a high altitude platform station (HAPS) network device comprising:
determining beam layer information corresponding to a plurality of beam layers, the beam layer information including information corresponding to a plurality of beam layers associated with a cell coverage area of the HAPS network device, the cell coverage area further including a plurality of beams, and each of the plurality of beam layers including at least one beam of the plurality of beams), the beam layer information including layer identifiers (ID) associated with each beam layer of the plurality of beam layers, and beam IDs associated with each beam included in each of the beam layers;
transmitting the beam layer information to at least one user equipment (UE);
receiving an autonomous beam switch request from the at least one UE in response to the transmitted beam layer information, the request including beam switch parameters;
determining a selected beam layer based on the beam switch parameters; and
enabling communication with the at least one UE using the selected beam layer.

18. The method of claim 17, further comprising:
determining a beam dwell time for each of the plurality of beam layers;
selecting a beam from the at least one beam associated with the selected beam layer based on reference time information included in the beam switch parameters, a beam dwell time corresponding to the selected beam layer, and a current time; and
enabling the communication with the at least one UE using the selected beam.

19. The method of claim 17, wherein
the beam switch parameters include a selected beam ID identifying a beam selected by the UE, and reference time information associated with the selected beam; and
the method further comprises:
determining the selected beam layer based on the selected beam ID;
selecting a transmission beam from the at least one beam associated with the determined beam layer based on the reference time information, a beam dwell time corresponding to the determined beam layer, and a current time; and
enabling the communication with the at least one UE using the transmission beam.

20. The method of claim 17, further comprising:
updating the beam layer information based on a change in a desired flight pattern of the HAPS network device or a change in a desired speed of the HAPS network device; and
transmitting the updated beam layer information to the at least one UE.

* * * * *